US008584771B2

(12) United States Patent
Vollmer et al.

(10) Patent No.: US 8,584,771 B2
(45) Date of Patent: Nov. 19, 2013

(54) MACHINE TOOL HAVING AN ELECTRIC DRIVE MOTOR

(75) Inventors: Rainer Vollmer, Neuhausen (DE); Marcus Schuller, Dettenhausen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/736,502

(22) PCT Filed: Mar. 13, 2009

(86) PCT No.: PCT/EP2009/052954
§ 371 (c)(1), (2), (4) Date: Oct. 14, 2010

(87) PCT Pub. No.: WO2009/127482
PCT Pub. Date: Oct. 22, 2009

(65) Prior Publication Data

US 2011/0036610 A1 Feb. 17, 2011

(30) Foreign Application Priority Data

Apr. 18, 2008 (DE) ........................ 10 2008 001 258

(51) Int. Cl.

| | |
|---|---|
| ***E21B 3/00*** | (2006.01) |
| ***E21B 17/22*** | (2006.01) |
| ***E21B 19/16*** | (2006.01) |
| ***E21B 19/18*** | (2006.01) |
| ***B25D 17/04*** | (2006.01) |
| ***B27C 3/08*** | (2006.01) |
| ***B23B 45/00*** | (2006.01) |

(52) U.S. Cl.
USPC .......................................... 173/217; 173/171

(58) Field of Classification Search
USPC .......... 173/217, 78, 130, 106; 310/50, 52, 58, 310/59, 60 R, 60 A, 61–62
See application file for complete search history.

(56) References Cited

U.S. PATENT DOCUMENTS

| | | | | | |
|---|---|---|---|---|---|
| 762,539 | A * | 6/1904 | Leiman et al. | ................ | 418/266 |
| 1,617,366 | A * | 2/1927 | Beard et al. | ................... | 188/290 |
| 2,277,264 | A * | 3/1942 | Youhouse | ..................... | 173/217 |
| 2,456,571 | A * | 12/1948 | Turner et al. | ..................... | 310/50 |
| 2,467,376 | A * | 4/1949 | Francis, Jr. | ...................... | 310/28 |
| 2,532,823 | A * | 12/1950 | Schumann | ...................... | 310/50 |
| 2,825,827 | A * | 3/1958 | Luenberger | ................. | 310/60 R |
| 2,970,233 | A * | 1/1961 | Penney | .......................... | 310/63 |
| 3,250,926 | A * | 5/1966 | O'Reilly et al. | ............ | 310/60 R |
| 3,398,306 | A * | 8/1968 | Merrick et al. | ............... | 310/408 |
| 3,412,270 | A * | 11/1968 | Wacek | ........................... | 310/66 |
| 3,462,623 | A * | 8/1969 | Batson et al. | .................. | 310/50 |
| 3,476,960 | A * | 11/1969 | Rees | ............................... | 310/50 |
| 3,617,786 | A * | 11/1971 | Stielper | ......................... | 310/242 |
| 3,699,366 | A * | 10/1972 | Wood | ............................. | 310/50 |

(Continued)

FOREIGN PATENT DOCUMENTS

EP 0023609 A1 2/1981

*Primary Examiner* — Robert Long
(74) *Attorney, Agent, or Firm* — Maginot, Moore & Beck

(57) ABSTRACT

A machine tool, in particular a powered hand tool, has an electric drive motor to which pole shoes are assigned in order to conduct a magnetic field. Furthermore, a fan wheel is provided in order to produce a stream of cooling air. In the housing, an air-guiding element forms a portion of the flow path for the stream of cooling air. According to the invention, the air-guiding element at least partially covers the pole shoes.

14 Claims, 4 Drawing Sheets

(56) References Cited

U.S. PATENT DOCUMENTS

| | | | | | |
|---|---|---|---|---|---|
| 3,701,911 | A * | 10/1972 | Hallerback | | 310/60 R |
| 3,980,909 | A * | 9/1976 | Klein | | 310/50 |
| 4,342,929 | A | 8/1982 | Horne | | |
| 4,510,403 | A * | 4/1985 | Vanderlaan et al. | | 310/36 |
| 4,666,386 | A * | 5/1987 | Winkler et al. | | 418/267 |
| 4,763,031 | A * | 8/1988 | Wang | | 310/83 |
| 5,392,884 | A * | 2/1995 | Ojima | | 188/293 |
| 5,818,142 | A * | 10/1998 | Edleblute et al. | | 310/239 |
| 5,954,405 | A * | 9/1999 | Toman | | 301/6.3 |
| 6,062,960 | A | 5/2000 | Kai et al. | | |
| 6,239,521 | B1 * | 5/2001 | Lee | | 310/62 |
| 6,369,470 | B1 * | 4/2002 | Kylander et al. | | 310/52 |
| 6,561,955 | B1 * | 5/2003 | Dreissigacker et al. | | 482/57 |
| 6,914,355 | B2 * | 7/2005 | Cardenas et al. | | 310/58 |
| 6,971,456 | B2 * | 12/2005 | Yamada et al. | | 173/217 |
| 7,034,416 | B2 * | 4/2006 | Simofi-Ilyes et al. | | 310/58 |
| 7,166,939 | B2 * | 1/2007 | Voigt et al. | | 310/47 |
| 7,171,997 | B2 * | 2/2007 | Nishikawa et al. | | 144/136.95 |
| 7,308,950 | B2 * | 12/2007 | Faatz et al. | | 173/217 |
| 7,309,935 | B2 * | 12/2007 | Braun et al. | | 310/62 |
| 7,449,810 | B2 * | 11/2008 | Yokota et al. | | 310/264 |
| 7,719,146 | B2 * | 5/2010 | Takahashi et al. | | 310/50 |
| 7,977,835 | B2 * | 7/2011 | Simofi-Ilyes et al. | | 310/89 |
| 2004/0263008 | A1 * | 12/2004 | Voigt et al. | | 310/58 |
| 2006/0175915 | A1 * | 8/2006 | Voigt et al. | | 310/58 |
| 2007/0179025 | A1 * | 8/2007 | Tsai | | 482/59 |
| 2008/0092363 | A1 * | 4/2008 | Faatz et al. | | 29/598 |
| 2010/0132968 | A1 * | 6/2010 | Hartmann | | 173/109 |
| 2011/0001368 | A1 * | 1/2011 | Lau | | 310/50 |
| 2011/0140553 | A1 * | 6/2011 | Ou et al. | | 310/71 |

* cited by examiner

MACHINE TOOL HAVING AN ELECTRIC DRIVE MOTOR

CROSS-REFERENCE TO RELATED APPLICATION

This application is a 35 USC 371 application of PCT/EP2009/052954 filed on Mar. 13, 2009.

BACKGROUND OF THE INVENTION

1. Field of the Invention

The invention relates to a machine tool, in particular a handheld power tool, having an electrical drive motor.

2. Description of the Prior Art

For cooling the motor, handheld power tools with an electrical drive motor, such as angle sanders, have a fan wheel in the housing, which is driven by the motor and generates a cooling air flow that is guided through the housing of the handheld power tool. Since in operation of the handheld power tool in machining a workpiece, abrasive dirt particles are created that are carried via the cooling air flow into the interior of the housing, there is the risk of soiling of the drive motor as well as other parts of the machine tool that are located in the housing. The abrasive particles can become deposited in the housing and lead to wear at pole piece winding overhangs of the electrical drive motor, for instance, which can trip a short circuit with an attendant functional failure. Moreover, the dirt particles increase friction and impair the cooling capacity of the cooling air flow, thus reducing the heat dissipation.

OBJECT AND ADVANTAGES OF THE INVENTION

It is the object of the invention to ensure the functional capability of a machine tool over a long period of operation.

The embodiment according to the invention is suitable for use in machine tools, in particular in handheld power tools, having an electrical drive motor, preferably electric handheld tools, which are used for sanding or some other metal-cutting machining operation. An alternating current motor, in particular a series-wound motor is preferably used as the electrical drive motor. Optionally, a direct current motor, such as a permanently excited motor, may also be used. The electrical drive motor has pole pieces for improved guidance of the magnetic field; the drive motor is furthermore assigned a fan wheel, which is driven by the armature shaft of the drive motor and by way of which a cooling air flow is generated for cooling the motor as well as other components of the machine tool. The cooling air flow is introduced into the housing of the machine tool, carried past the drive motor, and guided back out of the housing again via outflow openings.

According to the invention, in the housing an air guide element is provided, which is preferably disposed on a face end of the electric motor and forms a portion of the flow course of the cooling air flow inside the housing. The air guide element covers the pole pieces at least partially, so that the applicable portion of the pole pieces is located outside the flow course of the cooling air flow.

This embodiment has the advantage that the pole pieces are protected against the abrasive dirt particles that are entrained with the cooling air flow. The abrasive dust cannot become deposited on the pole pieces, particularly on winding overhangs of the pole pieces. The pole pieces are protected mechanically against soiling by the air guide element.

A further advantage resides in the optimized flow course, particularly in the vicinity of the pole pieces, since the air guide element, for protecting the pole pieces, additionally also forms a part of the flow course of the cooling air flow, and by way of the shape of the air guide element, an influence can be exerted on the flow. Moreover, air eddies are avoided in the vicinity of the pole pieces, which are disposed on the side of the air guide element remote from the flow course. Since interfering influences on the flow course, which are associated with pressure differences, are eliminated or at least reduced, a more tolerable noise pattern is also achieved, since no high frequencies and only slight amplitudes are generated in the flow.

In addition, noise shielding of the rotor of the electrical drive motor is also attained, so that less motor noise reaches the outside. Finally, there is less power loss in the electrical drive motor, because less turbulence, which draws mechanical energy from the drive motor as a result of pressure fluctuations, occurs.

In a preferred refinement, the air guide element has a pole piece receiving portion that receives the face end of the pole pieces and is located outside the flow course of the cooling air flow. The air guide element is preferably embodied as an air guide ring, and the pole piece receiving portion expediently forms an annular chamber which is located radially outside a cylindrical air guide stub that is a component of the air guide ring. The air guide stub, on one side, defines the flow course of the cooling air flow, and on the opposite side of its wall it defines the pole pieces, which are covered by the stub. Advantageously, the pole pieces are located radially outside the flow course, so that the pole piece receiving portion, embodied as an annular chamber, in the air guide ring is likewise located outside the flow course. Accordingly, the cooling air flow is carried axially through the motor between the armature of the electric motor, preferably embodied as an internal rotor motor, and the stator. With this air guidance, not only the stator parts but also the armature or rotor parts of the electric motor are cooled.

It may be expedient, in the air guide element disposed on an axial face end of the electric motor, to provide additional flow elements, such as at least one flow scoop protruding into the flow course and oriented in particular radially to the flow course, for the sake of achieving an improved or in a certain way desired flow guidance. The flow scoop can then be a fixed, invariable component of the air guide ring, or in an alternative version, it can be retained movably on the air guide element, for instance by way of a film hinge or the like.

The flow stub in the air guide ring serves in particular to receive the fan wheel, which is disposed coaxially to the armature or rotor shaft of the electric motor and is connected to the rotor in a manner fixed against relative rotation. The flow stub here communicates with the receiving chamber in the air guide element, in which the fan wheel is rotatably supported. The air guide element and the fan wheel thus form a structural unit, creating a so-called impeller, or in other words an encapsulated propeller.

BRIEF DESCRIPTION OF THE DRAWINGS

Further advantages and expedient embodiments can be learned from the further claims, the description of the drawings, and the drawings. In the drawings:

DESCRIPTION OF THE PREFERRED EMBODIMENTS

Figure 1:
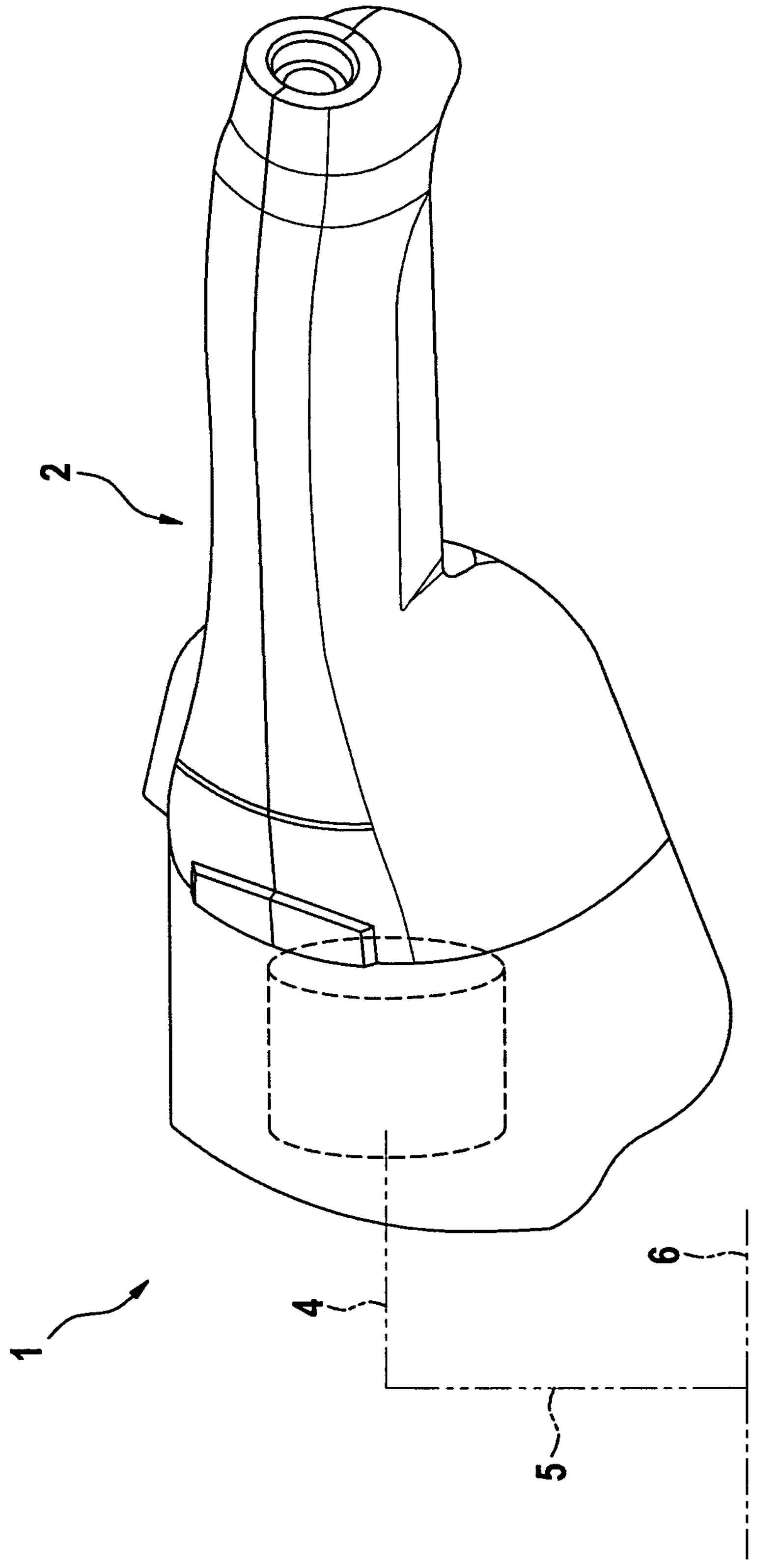
FIG. 1 is a schematic illustration of an electric handheld power tool.

In the drawings, identical components are identified by the same reference numerals.

The handheld power tool 1 shown in general fashion in FIG. 1 has, in a housing 2, an electrical drive motor 3, which is embodied in particular as an alternating current motor, preferably as a series-wound motor, but a direct current motor can also be considered. The rotor shaft or armature shaft 11 of the drive motor 3 has an axis 4 and is rotationally coupled to a tool shaft 5 supported rotatably in the housing and drives that shaft. A tool 6 for machining a workpiece is located on the tool shaft 5.

Figure 2:
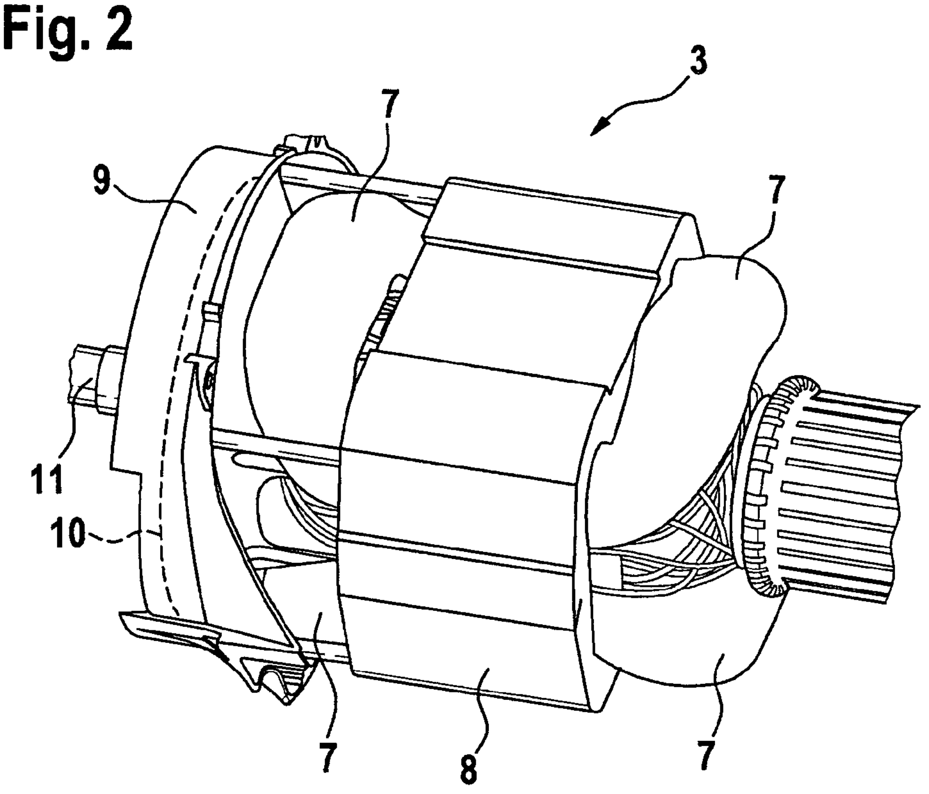
FIG. 2 is a perspective view of an electric motor in the handheld power tool, having an air guide ring disposed on an axial face end of the motor.
Figure 3:
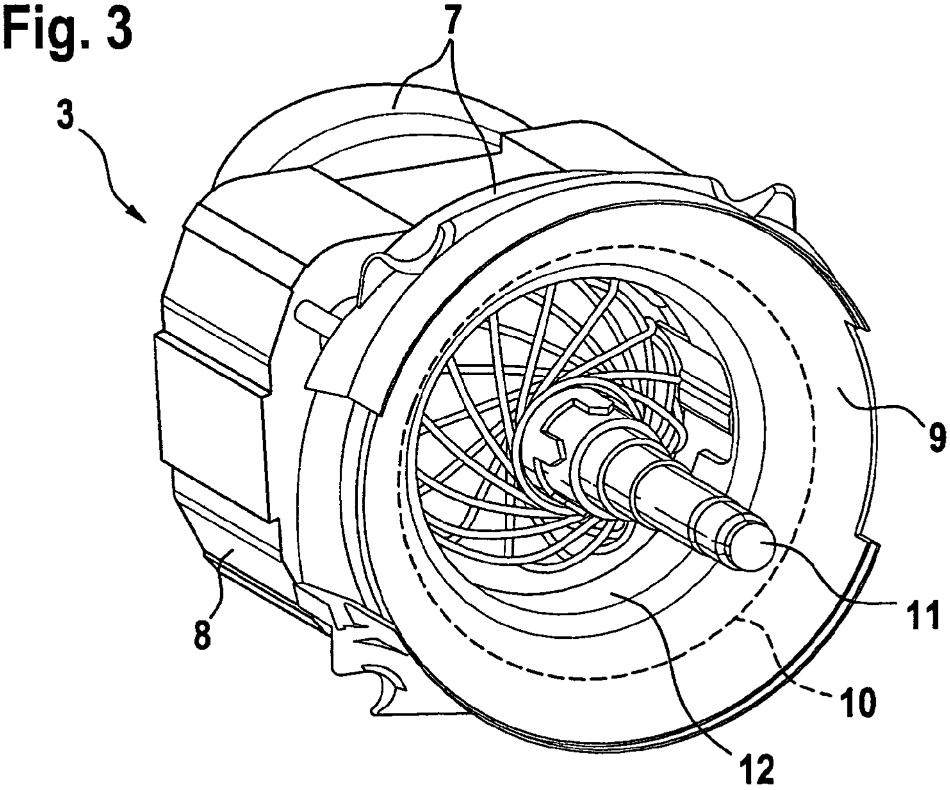
FIG. 3 shows the electric motor including the air guide ring in a further perspective view.

As can be seen from FIGS. 2 and 3, the electrical drive motor 3 has pole pieces 7, which are embodied in particular as winding overhangs and form a component of the stator of the drive motor. A magnetic return part 8 annularly surrounding the pole pieces 7 is also present and may optionally have permanent magnets as well.

On a face end of the electrical drive motor 3, an air guide ring 9 is located coaxially to the rotor shaft or armature shaft 11 of the drive motor, and in this ring 9, a fan wheel 10 shown only symbolically revolves rotatably and is coupled to the shaft 11 in a manner fixed against relative rotation. The air guide ring 9 embraces the fan wheel 10, and the two components together form an impeller.

As can be seen from FIG. 3, the air guide ring 9 has a radially tapered, axially extending air guide stub 12, which is embodied in one piece with the air guide ring and is preferably made from a plastic. The air guide stub 12 serves the purpose of flow guidance of cooling air that is guided through the housing of the handheld power tool and in particular is guided axially through the radial region between the armature and the stator of the electric motor. The air guide stub 12 forms a part of the flow course for the cooling air flow. The outside of the air guide stub 12, conversely, defines the axial face end of the pole pieces 7.

Figure 4:
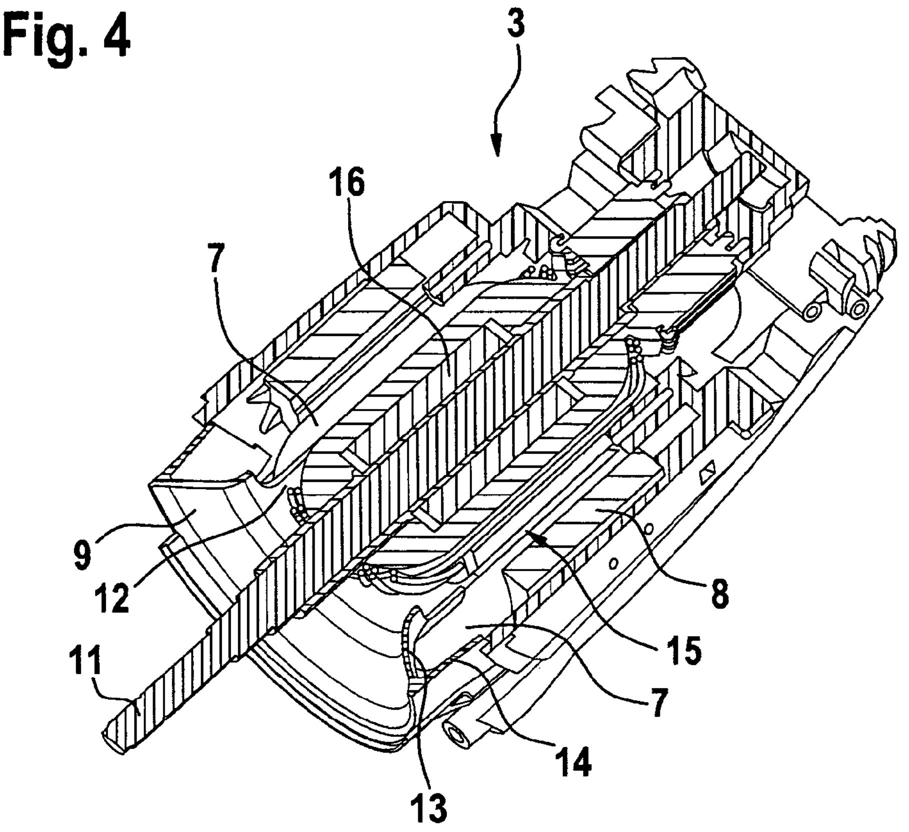
FIG. 4 is a section through the electric motor including the air guide ring.

As can be seen from the sectional view in FIG. 4, radially outside the cylindrical air guide stub 12, an annular chamber 13 is formed in the air guide ring 9, for receiving the face end of the pole pieces 7. The annular chamber 13 forms a pole piece receiving portion and is defined radially on the inside by the wall of the air guide stub 12 and radially on the outside by a further wall 14, which is embodied in one part or in one piece with the air guide ring 9.

Radially between the armature 16 and the radially embracing stator parts, such as the magnetic return part 8, an axially extending flow course 15 through the drive motor 3 is formed for the cooling air that is aspirated into the housing by the revolution of the fan wheel. The flow course 15 discharges into the air guide stub 12 of the air guide ring 9. In this way, the cooling air flow flows through the drive motor 3 over its axial length and is guided out of the air guide ring 9 axially via the open face end located facing the air guide stub 12.

Figure 5:
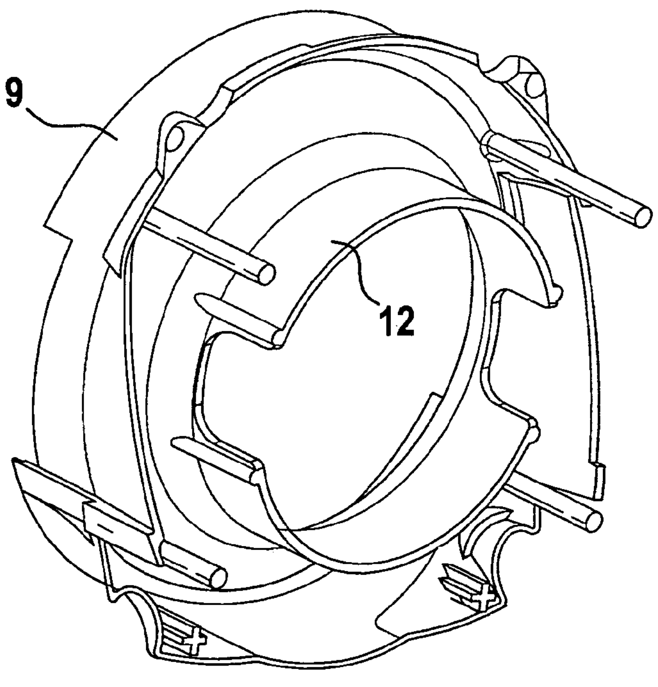
FIG. 5 shows the air guide ring in an individual perspective view.

In FIG. 5, the air guide ring 9 is shown again in an individual perspective view. The air guide stub 12 can be seen, which has approximately half the diameter of the outer diameter of the air guide ring 9. In the axial direction, the air guide stub 12 occupies at most half the length of the entire axial length of the air guide ring 9.

Figure 6:
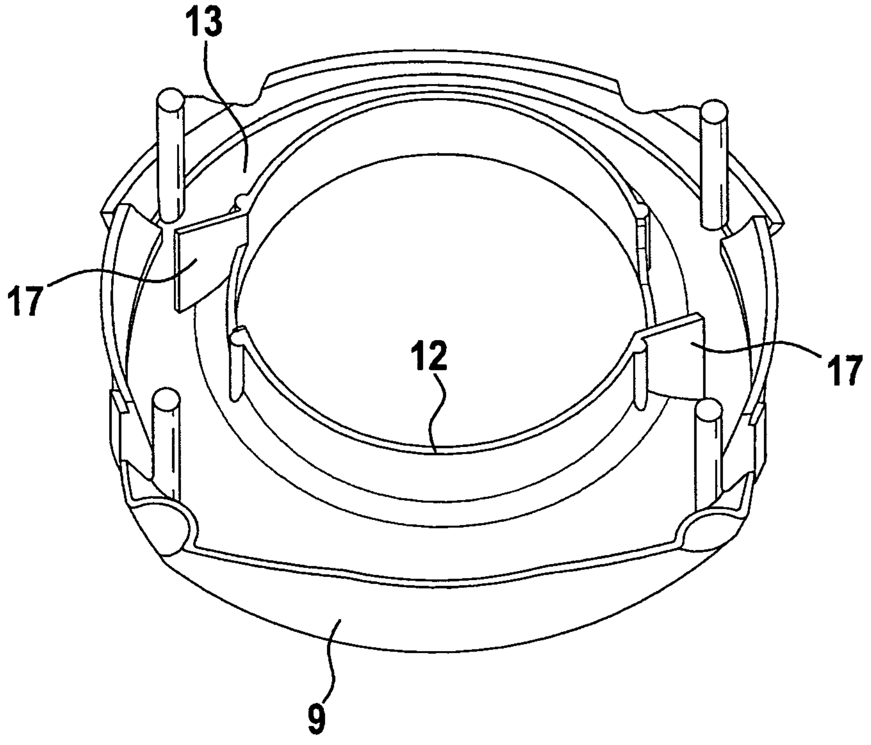
FIG. 6 shows the air guide ring in a further version, with additional flow scoops, oriented radially to the flow course.

In FIG. 6, an air guide ring 9 is shown in a modified version. Two diametrically opposed, radially outward-opening flow scoops 17 are formed in one part with the air guide stub 12; they form a component of the wall of the air guide stub 12, but opposite the cylinder wall are widened with a radial component and extend outward. The flow scoops 17 open in the direction of the annular chamber 13, which serves to receive the pole pieces. Thus a flow course is opened between the interior of the air guide stub 12, as a component of the flow course, and the annular chamber 13, so that a partial flow of the cooling air flow can enter the annular chamber 13 radially via the opened flow scoops 17 and ensures an additional cooling of the pole scoops.

The flow scoops 17 are optionally embodied movably and are meant to be adjusted between the open position, shown, and a closed position, in which positions the flow scoops 17 are located in the wall of the air guide stub 12, so that a radial crossover of cooling air is not possible. The pivotability of the flow scoops 17 can be formed for instance via a film hinge, by way of which the flow guide scoops are connected to the wall of the air guide stub 12. Fundamentally, however, a fixed, immovable embodiment of the flow scoops 17 is also possible.

The foregoing relates to the preferred exemplary embodiments of the invention, it being understood that other variants and embodiments thereof are possible within the spirit and scope of the invention, the latter being defined by the appended claims.

The invention claimed is:

1. A handheld power tool comprising:

an electrical drive motor, which has pole pieces for guiding a magnetic field;

a fan wheel for generating a cooling air flow to be guided through a housing of the power tool along a flow course; and an air guide element in the housing which forms a portion of the flow course of the cooling air flow, the air guide element arranged to cover the pole pieces in such a way that the pole pieces are located outside the flow course of the cooling air flow, wherein the air guide element includes an air guide ring into which the cooling air flow enters the housing and an air guide stub extending axially from the air guide ring in the direction of the flow course, the air guide ring and the air guide stub defining an annular chamber that receives a face end of the pole pieces, the annular chamber being bounded radially on the inside by the air guide stub and bounded radially on the outside by the air guide ring and located outside the flow course of the cooling air flow, and wherein the pole pieces are located radially outside the air guide stub and within the annular chamber.

2. The machine tool as defined by claim 1, wherein the air guide stub is embodied as part of the air guide ring.

3. The machine tool as defined by claim 1, wherein the air guide stub has at least one flow scoop protruding into the flow course.

4. The machine tool as defined by claim 3, wherein the at least one flow scoop is adjustable between an open position and a closed position.

5. The machine tool as defined by claim 3, wherein the at least one flow scoop is oriented radially to the flow course.

6. The machine tool as defined by claim 1, wherein the fan wheel is received in the air guide element.

7. The machine tool as defined by claim 1, wherein the fan wheel is received in the air guide ring.

8. The machine tool as defined by claim 1, wherein the air guide element is arranged so that the flow course of the cooling air flow extends on a radial inside of the pole pieces.

9. The machine tool as defined by claim 1, wherein the air guide element is arranged so that the flow course of the cooling air flow discharges into an interior space defined by the air guide stub.

10. The machine tool as defined by claim 1, wherein the air guide stub is situated radially inwardly of the air guide ring.

11. The machine tool as defined by claim 10, wherein at least one flow scoop is formed in one piece with the air guide stub and opens into the annular chamber serving as a pole piece receiving portion.

12. The machine tool as defined by claim 11, wherein the air guide element is arranged so that the flow course of the cooling air flow discharges into an interior of the cylindrical air guide stub and the at least one flow scoop opens a further flow course between the interior of the air guide stub and the annular chamber so that a partial flow of the cooling air flow enters the annular chamber radially.

13. The machine tool as defined by claim 11, wherein the at least one flow scoop is adjustable between an open position and a closed position.

14. A handheld power tool comprising:

an electrical drive motor, which has pole pieces for guiding a magnetic field;

a fan wheel for generating a cooling air flow to be guided through a housing of the power tool along a flow course; and an air guide element in the housing which forms a portion of the flow course of the cooling air flow, the air guide element arranged to cover the pole pieces in such a way that the pole pieces are located outside the flow course of the cooling air flow, wherein the air guide element includes an air guide ring into which the cooling air flow enters the housing and an air guide stub extending axially in the direction of the flow course, the air guide ring and the air guide stub defining an annular chamber that receives a face end of the pole pieces, the annular chamber being located outside the flow course of the cooling air flow, wherein the pole pieces are located radially outside the air guide stub and within the annular chamber, wherein the cylindrical air guide stub is situated radially inwardly of the air guide ring, wherein an inner wall surface of the air guide ring and an outer wall surface of the air guide stub define the annular chamber, wherein at least one flow scoop is formed in one piece with the air guide stub and opens into the annular chamber serving as a pole piece receiving portion, wherein the at least one flow scoop is adjustable between an open position and a closed position, and wherein the air scoop is connected to a wall of the air guide stub via a film hinge.

* * * * *